United States Patent
Finamore

(10) Patent No.: US 8,156,434 B2
(45) Date of Patent: Apr. 10, 2012

(54) METHODS AND ARRANGEMENTS FOR MANAGING COMPUTER MESSAGES

(75) Inventor: Jamie Lynn Finamore, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 981 days.

(21) Appl. No.: 11/772,203

(22) Filed: Jun. 30, 2007

(65) Prior Publication Data

US 2009/0007168 A1    Jan. 1, 2009

(51) Int. Cl.
*G06F 3/00* (2006.01)
(52) U.S. Cl. ........................ 715/705; 715/808
(58) Field of Classification Search .................. 715/863, 715/705, 808
See application file for complete search history.

(56) References Cited

U.S. PATENT DOCUMENTS

| | | | | |
|---|---|---|---|---|
| 6,661,345 B1* | 12/2003 | Bevan et al. | .................. | 340/575 |
| 7,027,621 B1* | 4/2006 | Prokoski | ........................ | 382/118 |
| 2004/0151347 A1* | 8/2004 | Wisniewski | .................. | 382/115 |
| 2004/0183685 A1* | 9/2004 | Strumolo et al. | ............. | 340/575 |
| 2006/0029198 A1* | 2/2006 | Dorneich et al. | .......... | 379/88.22 |
| 2008/0039698 A1* | 2/2008 | Burton | ........................ | 600/300 |
| 2009/0018419 A1* | 1/2009 | Torch | ............................ | 600/318 |
| 2009/0066722 A1* | 3/2009 | Kriger et al. | .................. | 345/619 |

* cited by examiner

*Primary Examiner* — Dennis G Bonshock
(74) *Attorney, Agent, or Firm* — Ference & Associates LLC

(57) ABSTRACT

An arrangement for determining those optimal times to permit an important pop-up message to be displayed by way of garnering a user's attention, while permitting less important messages to be displayed at times when a user's attention is unlikely to be garnered. In accordance with a particularly preferred embodiment, an arrangement is provided to recognize whether a user is looking towards a computer monitor and, at such times, to determine whether a blink rate of the user's eyes corresponds to a degree of focus and concentration that would ensure a strong likelihood of the user seeing or "catching" a message that may then appear. If such likelihood is thus determined to be strong, then a critical message may preferably then be displayed.

12 Claims, 2 Drawing Sheets

METHODS AND ARRANGEMENTS FOR MANAGING COMPUTER MESSAGES

FIELD OF THE INVENTION

The present invention relates to computer systems and, more particularly, to the appearance and management of messages on such systems.

BACKGROUND OF THE INVENTION

In the context of computers (e.g., desktops and laptops), it is common for a user to encounter a number of "pop-up" messages (or pop-up balloon messages) in the context of a single session. While many such messages can be unnecessary and even annoying, many may well contain critical system information. Such messages may appear in the context of online usage, offline usage, or both.

Many a user would not be averse to doing away with pop-up messages but for the occasional ones that indeed are important or critical. Such critical messages include, but are by no means limited to: a "low battery" warning message (in the context of a laptop or notebook computer) which indicates that a recharging or replacement of the battery is needed to prevent system shutdown or hibernation; and a "back up data" message which prompts a user to back up his or her files or data per a predetermined back-up schedule (e.g., monthly). Accordingly, to do away with pop-up messages entirely would deprive users of critical information that they may require at opportune times, and thus present significant risks such as inadvertent system shutdown or the loss of data or files that have not been backed up. However, methods and arrangements for managing pop-up messages in a way to "filter" out non-critical ones in favor of critical ones have hitherto been elusive.

A need has thus been recognized in connection with providing an effective way for pop-up messages to be managed such that critical ones may garner a user's attention while non-critical ones may be ignored or discarded.

SUMMARY OF THE INVENTION

In accordance with at least one presently preferred embodiment of the present invention, there is broadly contemplated herein an arrangement for determining those optimal times to permit an important pop-up message to be displayed by way of garnering a user's attention, while permitting less important messages to be displayed at times when a user's attention is unlikely to be garnered.

In accordance with a particularly preferred embodiment, an arrangement is provided to recognize whether a user is looking towards a computer monitor and, at such times, to determine whether a blink rate of the user's eyes corresponds to a degree of focus and concentration that would ensure a strong likelihood of the user seeing or "catching" a message that may then appear. If such likelihood is thus determined to be strong, then a critical message may preferably thence be displayed.

In summary, one aspect of the invention provides a system comprising: a CPU; a system memory in communication with the CPU; a display medium; a monitoring device acting to monitor a user's focus on the display medium; and a message management module acting to manage messages responsive to monitoring by the monitoring device.

Another aspect of the invention provides a method comprising: monitoring a user's focus on a computer display medium; and managing computer messages responsive to monitoring by the monitoring device.

Furthermore, an additional aspect of the invention provides a program storage device readable by machine, tangibly embodying a program of instructions executable by the machine to perform method steps comprising: monitoring a user's focus on a computer display medium; and managing computer messages responsive to monitoring by the monitoring device.

DESCRIPTION OF THE PREFERRED EMBODIMENTS

For a better understanding of the present invention, together with other and further features and advantages thereof, reference is made to the following description, taken in conjunction with the accompanying drawings, and the scope of the invention will be pointed out in the appended claims.

Figure 1:
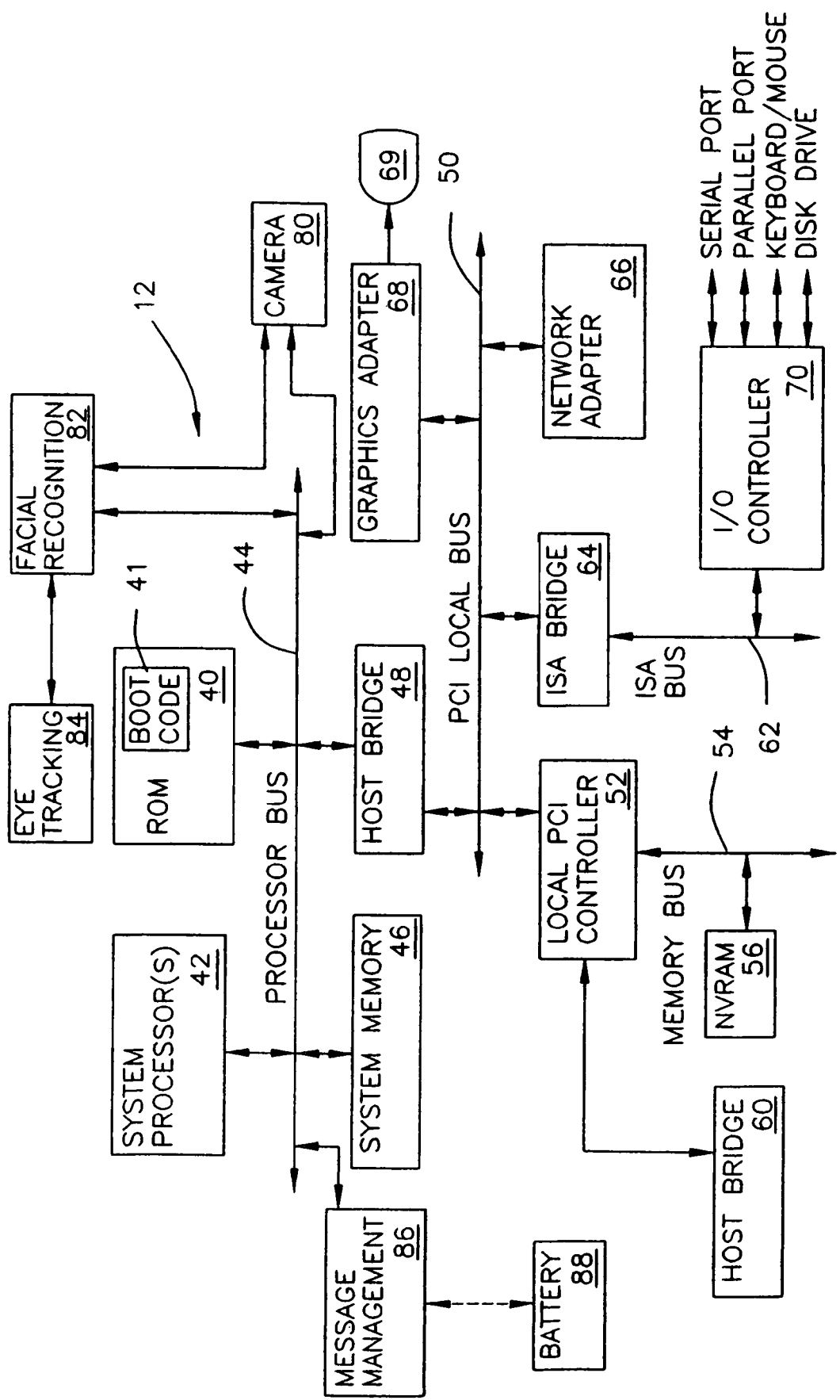
FIG. 1 is a block diagram of a computer system.
Figure 2:
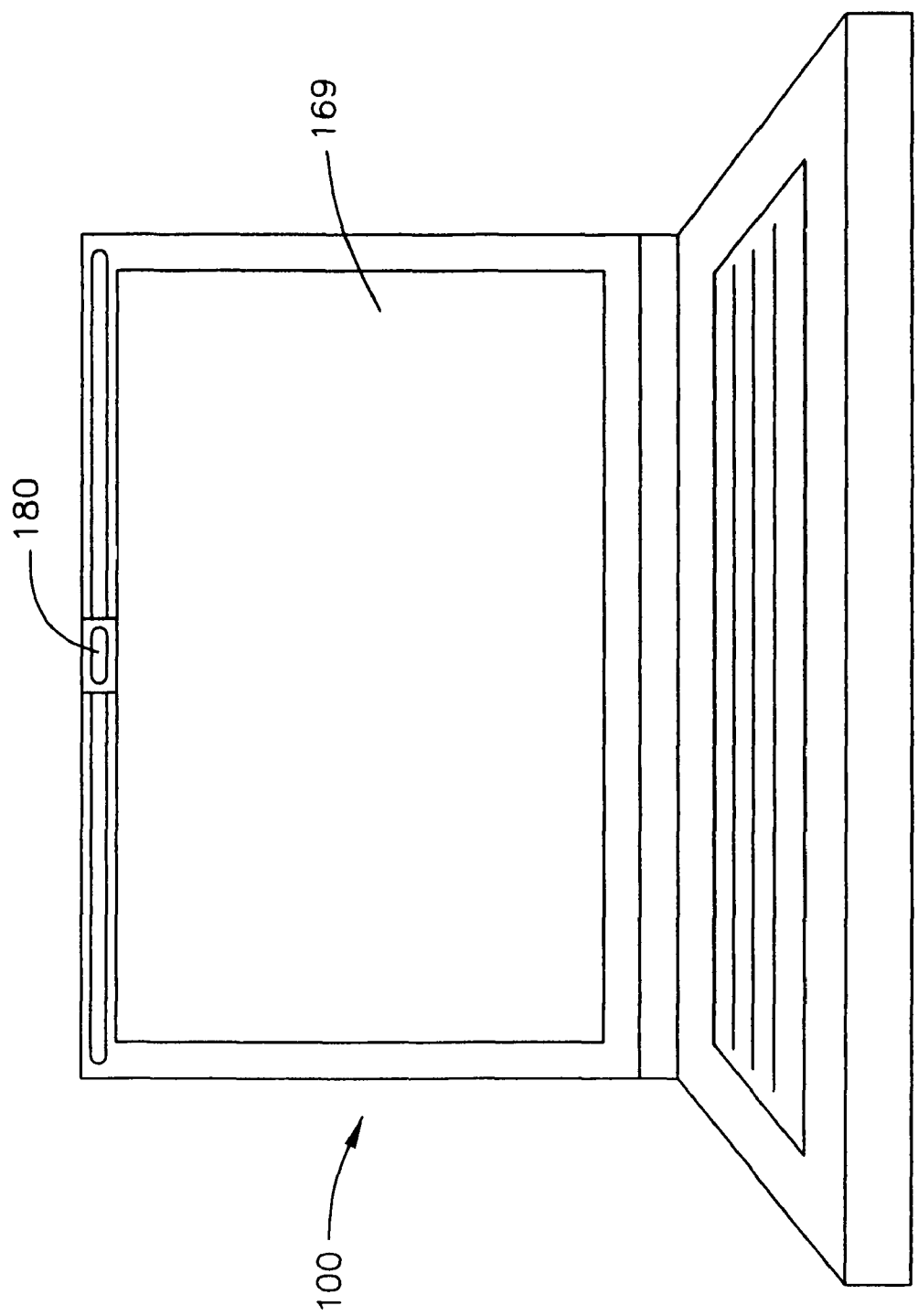
FIG. 2 is a perspective view of a laptop computer with built-in camera.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIGS. 1 through 2, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals or other labels throughout. The following description is intended only by way of example, and simply illustrates certain selected embodiments of devices, systems, and processes that are consistent with the invention as claimed herein.

Referring now to FIG. 1, there is depicted a block diagram of an illustrative embodiment of a computer system 12. The illustrative embodiment depicted in FIG. 1 may be a notebook computer system, such as one of the ThinkPad® series of personal computers sold by Lenovo (US) Inc. of Purchase, N.Y. or a workstation computer, such as the Intellistation®, which are sold by International Business Machines (IBM) Corporation of Armonk, N.Y.; however, as will become apparent from the following description, the present invention is applicable to the appearance and management of messages on any data processing system.

As shown in FIG. 1, computer system 12 includes at least one system processor 42, which is coupled to a Read-Only Memory (ROM) 40 and a system memory 46 by a processor bus 44. System processor 42, which may comprise one of the processors produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 12 to LAN 10, and graphics adapter 68, which interfaces computer system 12 to display (or monitor) 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 12 further includes Industry Standard Architecture (ISA) bus 62, which is coupled to PCI local bus 50 by ISA bridge 64. Coupled to ISA bus 62 is an input/output (I/O) controller 70, which controls communication between computer system 12 and attached peripheral devices such as a keyboard, mouse, and a disk drive. In addition, I/O controller 70 supports external communication by computer system 12 via serial and parallel ports.

It should be further understood that while FIG. 1 conveys specific hardware components that can be employed in accordance with embodiments of the present invention, the concepts discussed and contemplated herein are of course applicable to a very wide variety of computer systems and constituent conventional components.

It has been proven that a human's blink rate is an extremely reliable indicator of his or her level of concentration on an object or item being looked at. When relaxed, humans blink 20 times per minute on average. However, research has shown that a generally low blink rate translates to a higher level of concentration on an object, while a generally high blink rate translates to a lower level of concentration. (See, for instance, Orchard LN and Stern JA, "Blinks as an index of cognitive activity during reading," 26(2):108-16, *Integr. Physiol. Behav. Sci.*, (1991).

In accordance with a presently preferred embodiment of the present invention, a computer user's blink rate may preferably be ascertained to determine his or her level of concentration with respect to a computer display monitor and, by extension, to determine an optimal time to display critical pop-up messages on the monitor. As mentioned previously, "critical" messages may encompass, for example, low battery warning messages or back-up reminder messages.

Accordingly, as further illustrated in FIG. 1 in accordance with a preferred embodiment of the present invention, a camera 80 disposed at display 69 may preferably be employed for the purpose just described. Thus, camera 80 will preferably be in communication with a facial recognition module 82 that, for its part, includes or is in communication with an eye tracking module 84.

Preferably, facial recognition module 82 may employ conventional facial recognition software and, as such, will be configured to automatically determine:

if a user is facing the display 69; and if the user's eyes are focused on the display 69.

If, indeed, a user's eyes are focused on the display 69 for a predetermined time duration, eye tracking module 84 can then preferably activate automatically to measure the user's blink rate and thus determine the user's presumable cognitive load.

Accordingly, a low blink rate would correspond to a high degree of concentration, and thus a strong likelihood that the user would notice a pop-up message on display 69. On the other hand, a high blink rate or indeterminate eye focus would correspond to a lower degree of user concentration, and thus a strong likelihood that the user would not notice a pop-up message on display 69.

Generally, pop-up messages are managed by a computer operating system (OS) but can also be managed by other modules in a computer system for specific purposes. For instance, a battery may be in communication with its own module for managing messages specifically relating to the battery. Accordingly, reference made hereinafter to a "message management module" should be understood to encompass any singular or collective arrangement of modules configured for managing any online or offline pop-up messages that may be displayed at display 69, wherein it should be understood that a primary thrust of the methods and arrangements broadly contemplated herein resides in the concept of managing essentially any displayable message as a function of a user's presumed concentration.

Accordingly, a message management module 86 will thus preferably be configured for ascertaining determining those times when a user's concentration or focus on the display monitor 69 is relatively high (i.e., low blink rate) and permit, at such times, a critical pop-up message to be displayed. Module 86 is preferably in communication with a computer's battery 88 (if one is present) to the extent that one or more types of message related to battery 88 are intended to be managed. Conversely, message management module 86 will preferably be configured to permit the display of non-critical pop-up messages in the presence of low user concentration (i.e., high blink rate). A blink rate threshold can preferably be predetermined and established for the purposes just described.

Further, to the extent that facial recognition module 82 determines that a user is facing the display 69 and that the user's eyes are focused on display 69, there can also preferably be predetermined and established a minimum time interval over and above which a user's eyes would need to be focused on display 69 in order for a valid blink rate to be measured. In other words, if a user has a blink rate below the threshold value for a period of time that is less than the minimum time interval just mentioned, then preferably the display of critical pop-up messages will not be permitted. This minimum time interval conceivably could be tailored on the basis of individual users and their known range of blink rates (as a function of focus/concentration) and/or on the basis of ranges of blink rates known to be associated with predetermined cohort groups (e.g. children vs. adults).

FIG. 2 shows, in perspective view, a laptop computer 100 that includes a display 169 and a built-in camera 180 disposed above display 169, which camera 180 can function in similar manner to the camera 80 discussed hereinabove. The computer 100 shown corresponds to the "Y300 SERIES" notebook computers manufactured by Lenovo and is provided as an illustrative and non-restrictive example; these commercially available computers already include facial recognition software ("VERIFACE") that is configured for recognizing a user's face in lieu of prompting for a password. Such software can easily be reconfigured to carry out the additional functions of measuring blink rate as discussed hereabove.

Indeed, within the scope of the embodiments of the present invention, a built-in camera could be employed for providing an input to facial recognition software, or a computer could be retrofitted to include a camera as an add-on component (e.g., attached to the top of a display) to serve a like purpose.

Though the bulk of the discussion hereinabove has focused on laptop or notebook computers as suitable environments in which the embodiments of the present invention may be employed, it should be understood that other types of computers, such as desktop computers, can easily accommodate arrangements for measuring a blink rate and managing pop-up messages as discussed hereinabove.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A system comprising:
   one or more processors;
   a system memory in communication with the one or more processors;
   one or more computing device display mediums;
   one or more monitoring devices acting to monitor a user's focus on the one or more computing device display mediums; and
   a message management module acting to manage system messages responsive to monitoring by the one or more monitoring devices, wherein said message management module acts to:
   categorize system messages as first category messages comprising one or more critical messages or second category messages comprising one or more non-critical messages, wherein the one or more critical messages includes at least one message selected from the group consisting of: a low battery warning message and a back-up reminder message;
   filter display of the system messages on the one or more computing device display mediums based on a user's focus as determined by the one or more monitoring devices, wherein filtering comprises:
   suppressing display of the one or more first category messages and permitting display of the one or more second category messages at the one or more computing device display mediums responsive to the user's focus being below a threshold value; and
   suppressing display of the one or more second category messages and permitting display of the one or more first category messages at the one or more computing device display mediums responsive to the user's focus being above a threshold value.

2. The system according to claim 1, wherein:
   the one or more monitoring devices act to monitor a user blink rate; and
   said message management module acts to:
   suppress display of the one or more second category messages and permit display of the one or more first category messages at the one or more computing device display mediums responsive to a user blink rate below a predetermined threshold; and
   permit display of the one or more second category messages and suppress display of the one or more first category messages at the one or more computing device display mediums responsive to a user blink rate above a predetermined threshold.

3. The system according to claim 1, wherein said message management module acts to manage pop-up messages responsive to monitoring by the one or more monitoring devices.

4. The system according to claim 1, wherein the one or more monitoring devices act to:
   determine whether a user is facing the one or more computing device display mediums; and
   determine whether a user's eyes are directed towards the one or more computing device display mediums.

5. The system according to claim 4, wherein the one or more monitoring devices further act to determine whether a user's eyes are directed towards the one or more computing device display mediums for a predetermined time span and to thereupon prompt a comparison of the user's blink rate to a predetermined threshold.

6. The system according to claim 1, wherein the one or more monitoring devices comprise one or more facial recognition modules.

7. The system according to claim 6, wherein the one or more monitoring devices comprise one or more eye tracking modules which measure the user's blink rate.

8. A method comprising:
   monitoring a user's focus on one or more computing device display mediums utilizing one or more monitoring devices; and
   configuring a message management module to manage messages responsive to monitoring by the one or more monitoring devices, wherein said message management module acts to:
   categorize system messages as first category messages comprising one or more critical messages or second category messages comprising one or more non-critical messages, wherein the one or more critical messages includes at least one message selected from the group consisting of: a low battery warning message and a back-up reminder message;

filter display of the system messages on the one or more computing device display mediums based on a user's focus as determined by the one or more monitoring devices, wherein filtering comprises:

suppressing display of the one or more first category messages and permitting display of the one or more second category messages at the one or more computing device display mediums responsive to the user's focus being below a threshold value; and suppressing display of the one or more second category messages and permitting display of the one or more first category messages at the one or more computing device display mediums responsive to the user's focus being above a threshold value.

9. The system according to claim 8, wherein:

said monitoring comprises monitoring a user blink rate;

said message management module acts to:

suppress display of the one or more second category messages and permit display of the one or more first category messages at the one or more computing device display mediums responsive to a user blink rate below a predetermined threshold; and permit display of the one or more second category messages and suppress display of the one or more first category messages at the one or more computing device display mediums responsive to a user blink rate above a predetermined threshold.

10. The system according to claim 8, wherein said monitoring comprises:

determining whether a user is facing the one or more computing device display mediums; and determining whether a user's eyes are directed towards the one or more computing device display mediums.

11. The system according to claim 10, wherein the one or more monitoring devices further act to determine whether a user's eyes are directed towards the one or more computing device display mediums for a predetermined time span and to thereupon prompt a comparison of the user's blink rate to a predetermined threshold.

12. A program storage device readable by machine, tangibly embodying a program of instructions executable by the machine to perform method steps comprising:

monitoring a user's focus on one or more computing device display mediums utilizing one or more monitoring devices; and managing computer messages utilizing a message management module responsive to monitoring by the one or more monitoring devices, wherein said message management module acts to:

categorize system messages as first category messages comprising one or more critical messages or second category messages comprising one or more non-critical messages, wherein the one or more critical messages includes at least one message selected from the group consisting of: a low battery warning message and a back-up reminder message;

filter display of the system messages on the one or more computing device display mediums based on a user's focus as determined by the one or more monitoring devices, wherein filtering comprises:

suppressing display of the one or more first category messages and permitting display of the one or more second category messages at the one or more computing device display mediums responsive to the user's focus being below a threshold value; and suppressing display of the one or more second category messages and permitting display of the one or more first category messages at the one or more computing device display mediums responsive to the user's focus being above a threshold value.

* * * * *